US009751330B2

(12) United States Patent
Jintsugawa et al.

(10) Patent No.: US 9,751,330 B2
(45) Date of Patent: *Sep. 5, 2017

(54) PRINTING APPARATUS, PRINTING CONTROL SYSTEM AND CONTROL METHOD OF THE PRINTING APPARATUS

(71) Applicant: Seiko Epson Corporation, Tokyo (JP)

(72) Inventors: Kei Jintsugawa, Suwa (JP); Tomoharu Kifuku, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/153,450

(22) Filed: May 12, 2016

(65) Prior Publication Data
US 2016/0257134 A1 Sep. 8, 2016

Related U.S. Application Data

(63) Continuation of application No. 14/287,819, filed on May 27, 2014, now Pat. No. 9,365,035.

(30) Foreign Application Priority Data

May 24, 2013 (JP) ................. 2013-109481

(51) Int. Cl.
B41J 3/407 (2006.01)
G06F 3/12 (2006.01)
(Continued)

(52) U.S. Cl.
CPC ............ B41J 3/4075 (2013.01); B41J 2/01 (2013.01); B41J 2/07 (2013.01); G06F 3/1205 (2013.01);
(Continued)

(58) Field of Classification Search
CPC ..................................... B41J 3/4075
See application file for complete search history.

(56) References Cited

U.S. PATENT DOCUMENTS 5,025,398 A 6/1991 Nelson
5,751,924 A 5/1998 Hamada et al.
(Continued)

FOREIGN PATENT DOCUMENTS

JP 57-89981 A 6/1982
JP 10-006572 A 1/1998
(Continued)

OTHER PUBLICATIONS

U.S. Appl. No. 14/287,819, filed May 27, 2014, Printing Apparatus, Printing Control System and Control Method of the Printing Apparatus.

Primary Examiner — Shelby Fidler
(74) Attorney, Agent, or Firm — Nutter McClennen & Fish LLP; John J. Penny, Jr.

(57) ABSTRACT

A printing apparatus capable of continuously printing images on a recording medium, each of the images including a variable image of which an aspect is variable for each of the images to be continuously printed and a fixed image of which an aspect is the same for each of the images to be continuously printed, the printing apparatus includes a storage unit that associates and stores therein image data of the fixed image and a template having at least information about a position of printing an image, and a printing control unit that, when a control command which includes information for designating the template and instructs a printing of the variable image is input, superimposes the variable image and the fixed image associated with the designated template, on the basis of the template and print the superimposed image.

15 Claims, 6 Drawing Sheets

| | D1 | D2 | D3 | D4 | D5 |
|---|---|---|---|---|---|
| | TEMPLATE NAME | AREA NAME | AREA REFERENCE COORDINATES | SIZE | IMAGE TYPE |
| | TEMPLATE T1 | AREA A1 | (X1, Y1) | (W1, H1) | TEXT |
| | | AREA A2 | (X2, Y2) | (W2, H2) | BARCODE |
| | | AREA A3 | (X3, Y3) | (W3, H3) | TEXT |

(51) Int. Cl.
  *B41J 2/07* (2006.01)
  *G06K 15/02* (2006.01)
  *B41J 2/01* (2006.01)

(52) U.S. Cl.
  CPC .......... *G06F 3/1243* (2013.01); *G06F 3/1257* (2013.01); *G06K 15/022* (2013.01); *G06K 15/024* (2013.01)

(56) References Cited

U.S. PATENT DOCUMENTS

| | | |
|---|---|---|
| 6,118,543 A | 9/2000 | Kim et al. |
| 6,172,688 B1 | 1/2001 | Iwasaki et al. |
| 6,243,172 B1 | 6/2001 | Gauthier et al. |
| 6,789,482 B2 | 9/2004 | Yokoyama et al. |
| 2002/0089681 A1 | 7/2002 | Gauthier |
| 2002/0149792 A1 | 10/2002 | Gauthier et al. |
| 2005/0099442 A1 | 5/2005 | Payne |
| 2005/0099455 A1 | 5/2005 | Payne |
| 2005/0099639 A1 | 5/2005 | Payne et al. |
| 2005/0100384 A1 | 5/2005 | Boudreau |
| 2005/0111021 A1 | 5/2005 | Payne et al. |
| 2006/0028659 A1 | 2/2006 | Nishikawa |
| 2008/0204809 A1 | 8/2008 | Miyashita et al. |
| 2010/0149588 A1 | 6/2010 | Honda |
| 2013/0188207 A1* | 7/2013 | Shiohara ................ H04N 1/60 358/1.9 |
| 2014/0071467 A1 | 3/2014 | Asada |
| 2014/0247464 A1* | 9/2014 | Sugimoto ............ G06K 15/002 358/1.15 |
| 2014/0347412 A1 | 11/2014 | Jintsugawa et al. |

FOREIGN PATENT DOCUMENTS

| | | |
|---|---|---|
| JP | 2007-136913 A | 6/2007 |
| JP | 2007-514564 A | 6/2007 |
| JP | 2008-210217 A | 9/2008 |

\* cited by examiner

☒ · · · RED

☒ · · · RED

PRIOR ART

| TEMPLATE NAME | AREA NAME | AREA REFERENCE COORDINATES | SIZE | IMAGE TYPE |
|---|---|---|---|---|
| TEMPLATE T1 | AREA A1 | (X1, Y1) | (W1, H1) | TEXT |
| | AREA A2 | (X2, Y2) | (W2, H2) | BARCODE |
| | AREA A3 | (X3, Y3) | (W3, H3) | TEXT |

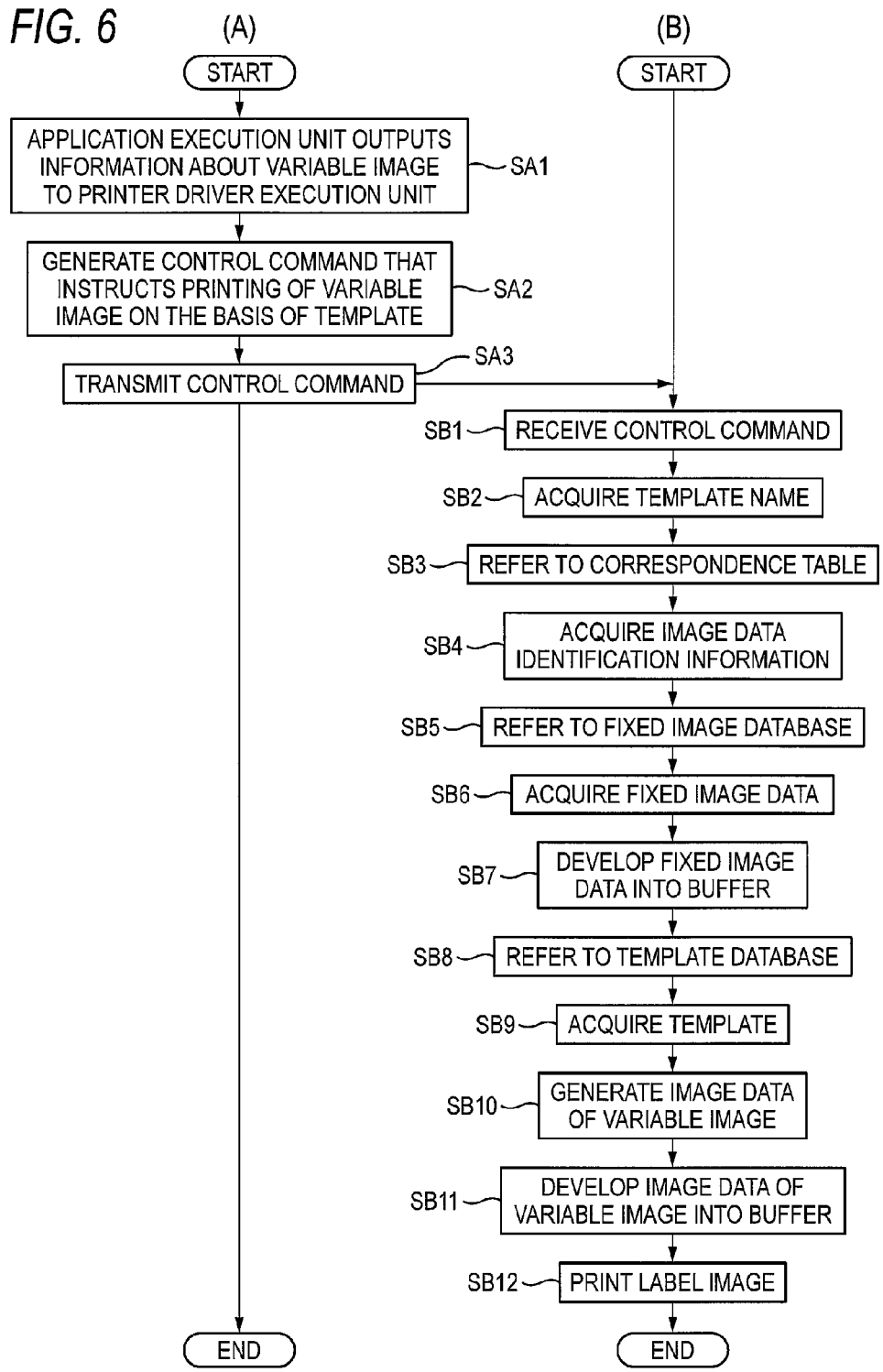

PRINTING APPARATUS, PRINTING CONTROL SYSTEM AND CONTROL METHOD OF THE PRINTING APPARATUS

This application is a continuation of U.S. application Ser. No. 14/287,819, filed May 27, 2014 whose priority is claimed from Japanese Patent Application No. 2013-109481 filed on May 24, 2013, the contents of which are hereby incorporated by reference in their entirety.

BACKGROUND

1. Technical Field

The exemplary embodiment relates to a printing apparatus that can continuously print label images, a printing control system including the printing apparatus and a control apparatus that can be connected to the printing apparatus, and a control method of the printing apparatus.

2. Related Art

A printing apparatus (a label printer) has been known which continuously prints images on a recording medium (a label sheet) while conveying the recording medium (for example, refer to JP-A-2007-136913).

In the above printing apparatus, a following recording medium, i.e., a label sheet on which label parts having a predetermined size are adhered to a release sheet at a constant interval may be set. The printing apparatus continuously prints images on each label part. Regarding this label sheet, a label sheet has been known on which a fixed image (for example, an image configuring an edge of a label), which is an image common to each label part, is beforehand printed on each label part.

Here, when using the label sheet on which the fixed image is previously printed on the label parts, if it is necessary to change the fixed image due to a change of the design, for example, the label sheet that has been already prepared may be useless.

Also, as for a printing of a label image including a fixed image and a variable image, there is a need to print the variable image in an appropriate aspect based on an aspect of the fixed image.

The exemplary embodiment has been made keeping in mind the above situations, and an advantage of the preferred embodiment is to print a variable image in an appropriate aspect based on an aspect of a fixed image while suppressing a waste of a recording medium.

SUMMARY (1) According to an aspect of the invention, a printing apparatus capable of continuously printing images on a recording medium, each of the images including a variable image of which an aspect is variable for each of the images to be continuously printed and a fixed image of which an aspect is the same for each of the images to be continuously printed, the printing apparatus including a storage unit that associates and stores therein image data of the fixed image and a template having at least information about a position of printing an image, and a printing control unit that, when a control command which includes information for designating the template and instructs a printing of the variable image is input, superimposes the variable image and the fixed image associated with the designated template, on the basis of the template and print the superimposed image.

(2) In the printing apparatus according to the configuration (1), the recording medium is a label sheet on which label parts are continuously provided at an interval, and when a control command which includes the information for designating the template and instructs a printing of the variable image on the label part, is input, the printing control unit superimposes and prints the fixed image and the variable image on the label part, based on the designated template.

(3) In the printing apparatus according to the configuration (1), information regarding a position of printing an image is defined in the template so that the variable image and the fixed image do not overlap with each other when printing the variable image with being superimposed over the fixed image based on the template.

(4) In the printing apparatus according to the configuration (1), the printing control unit extracts the information for designating the template from the input control command and extracts the designated template and the image data of the associated fixed image from the storage unit based on the extracted information.

(5) In the printing apparatus according to the configuration (1), the information for designating the template is a template name of the template.

(6) According to another aspect of the invention, a printing control system includes a printing apparatus capable of continuously printing images on a recording medium, and a control apparatus that is connectable to the printing apparatus. Each of the images includes a variable image of which an aspect is variable for each of the images to be continuously printed and a fixed image of which an aspect is the same for each of the images to be continuously printed. The printing apparatus includes a storage unit that associates and stores therein image data of the fixed image and a template having at least information about a position of printing an image. The control apparatus transmits a control command, which includes information for designating the template and instructs a printing of the variable image. The printing apparatus includes a printing control unit that, when the control command is transmitted from the control apparatus, superimposes and prints the variable image and the fixed image associated with the designated template, on the basis of the template.

(7) In the printing control system according to the configuration (6), the recording medium is a label sheet on which label parts are continuously provided at an interval, the control apparatus transmits a control command, which includes the information for designating the template and instructs a printing of the variable image on the label part, to the printing apparatus, and the printing apparatus superimposes and prints the fixed image and the variable image on the label part, based on the transmitted control command.

(8) In the printing control system according to the configuration (6), wherein information regarding a position of printing an image is defined in the template so that the variable image and the fixed image do not overlap with each other when printing the variable image with being superimposed over the fixed image based on the template.

(9) In the printing control system according to the configuration (6), the control apparatus further includes an application execution unit that generates information about the variable image, and a driver execution unit that generates the control command instructing the printing apparatus to print the variable image, based on the information about the variable image input from the application execution unit. The information about the variable image includes the information for designating the template that is used to print the variable image.

(10) In the printing control system according to the configuration (6), the printing control unit of the printing apparatus extracts the information for designating the template from the control command transmitted from the control apparatus and extracts the designated template and the image data of the associated fixed image from the storage unit on the basis of the extracted information.

(11) Also, in the printing control system that is an illustrative embodiment of the invention, the information for designating the template is a template name of the template.

(12) According to another aspect of the invention, a control method of a printing apparatus capable of continuously printing images on a recording medium, each of the images including a variable image of which an aspect is variable for each of the images to be continuously printed and a fixed image of which an aspect is the same for each of the images to be continuously printed, the control method includes associating and storing image data of the fixed image and a template having at least information about a position of printing an image, and when a control command, which comprises information for designating the template and instructs a printing of the variable image, is input, superimposing and printing the variable image and the fixed image associated with the designated template, on the basis of the template.

(13) In the control method according to the configuration (12), the recording medium is a label sheet on which label parts are continuously provided at an interval, and when a control command which includes the information for designating the template and instructs a printing of the variable image on the label part is input, the fixed image and the variable image are printed with being superimposed on the label part, based on the designated template.

(14) In the control method according to the configuration of (12), information regarding a position of printing an image is defined in the template so that the variable image and the fixed image do not overlap with each other when printing the variable image with being superimposed over the fixed image based on the template.

(15) The control method according to the configuration of (12) further includes extracting the information for designating the template from the input control command and extracting the designated template and the image data of the associated fixed image on the basis of the extracted information.

(16) In the control method according to the configuration (12), the information for designating the template is a template name of the template.

BRIEF DESCRIPTION OF THE DRAWINGS

FIG. 6 is a flowchart showing operations of the host computer and the line inkjet printer.

DESCRIPTION OF EXEMPLARY EMBODIMENTS

Hereinafter, an illustrative embodiment of the invention will be described with reference to the drawings.

Figure 1:
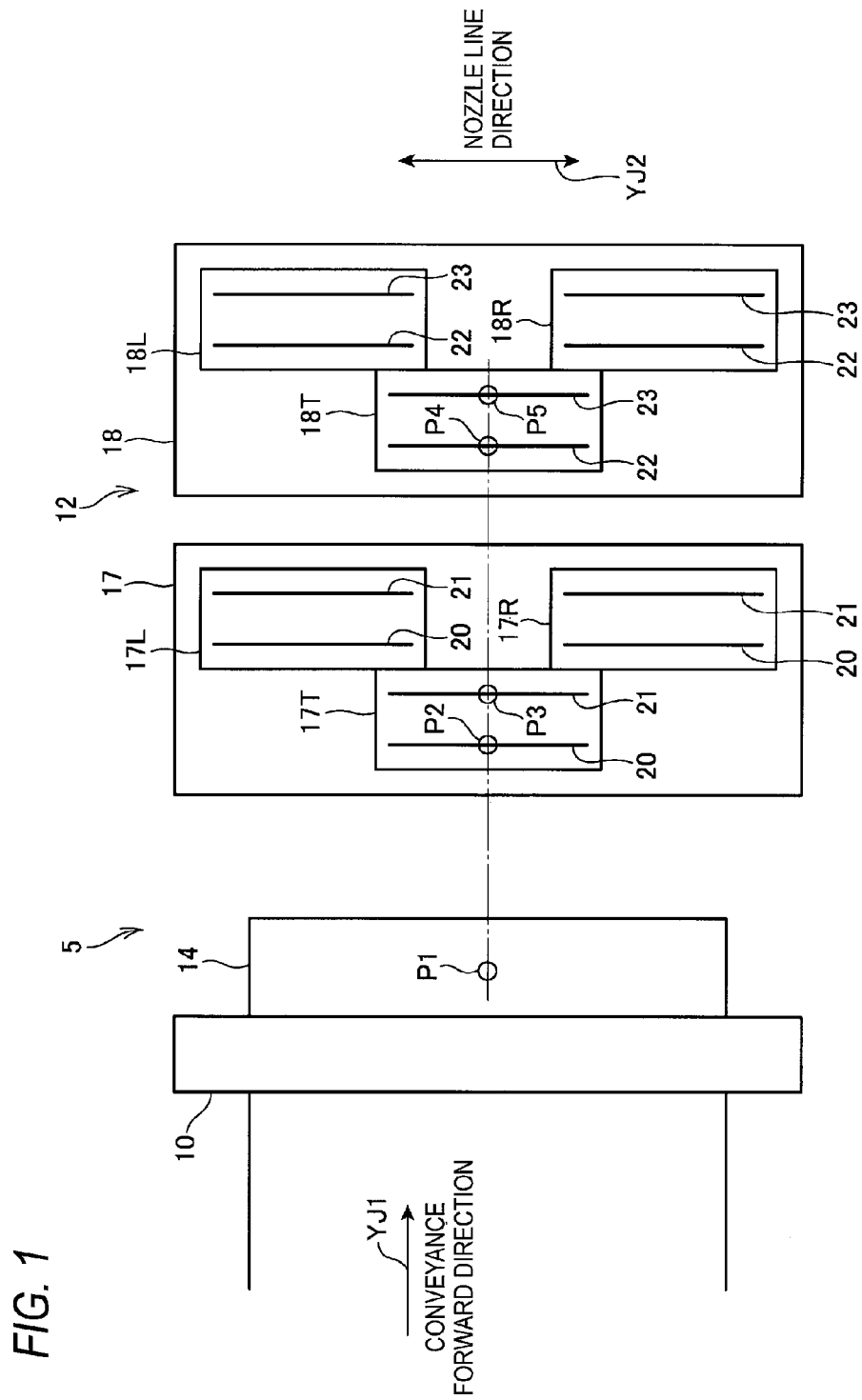
FIG. 1 shows a configuration of a line inkjet printer according to an illustrative embodiment of the invention.

FIG. 1 pictorially shows a configuration of a printing mechanism of an inkjet printer 5 (the printing apparatus) according to this illustrative embodiment.

The inkjet printer 5 is a line-type inkjet printer that that prints an image on a label sheet 14 (the recording medium) by discharging inks onto the label sheet 14 from a line inkjet head 12 while conveying the label sheet 14 by a conveyance roller 10.

The inkjet printer 5 can print at least an image on the label sheet 14 that is the recording medium.

Figure 2:
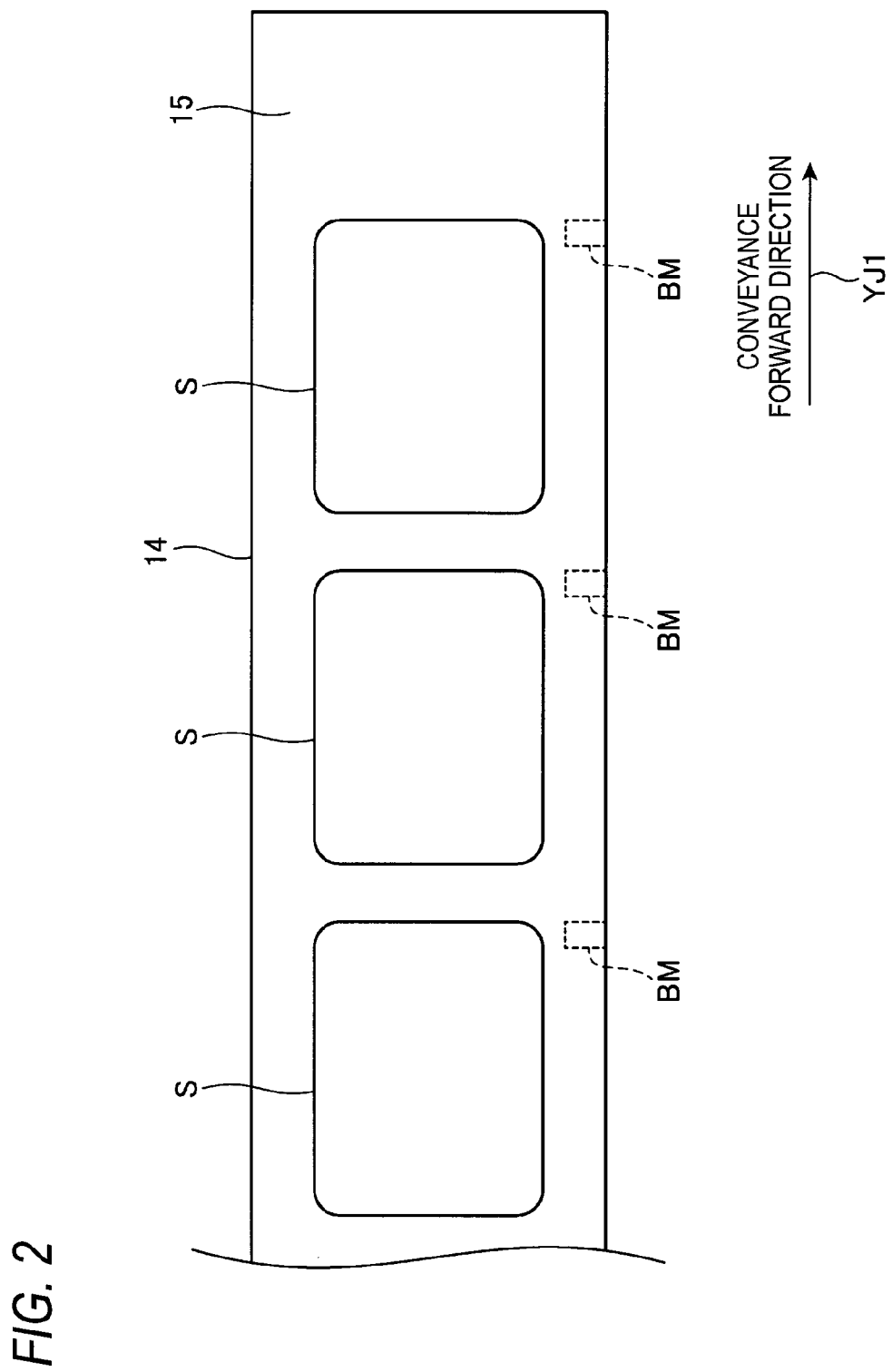
FIG. 2 shows a label sheet.

FIG. 2 pictorially shows the label sheet 14.

As shown in FIG. 2, the label sheet 14 is a band-shaped sheet and has a configuration where a plurality of label parts S is adhered to a release sheet on a printing surface 15. A portion corresponding to the label part S is sealed and can be peeled off from the release sheet along an edge thereof. As for the label sheet 14, a length of the label part S in a longitudinal direction is constant and the interval between the respective label parts S in the longitudinal direction is also constant. As described later, the inkjet printer 5 can continuously print images on the respective label parts S formed on the label sheet 14.

When a printing for the label sheet 14 is performed by the inkjet printer 5, the label sheet 14 is set on the inkjet printer 5 so that the longitudinal direction of the label sheet 14 corresponds to a conveyance forward direction YJ1, and a predetermined image is printed on the label part S while the label sheet is conveyed in the conveyance forward direction YJ1.

As shown in FIG. 2, a backside of the label sheet 14 is formed with black marks BM in correspondence to the respective label parts S. Although not shown in FIG. 1, in the inkjet printer 5, a black mark sensor 42 (FIG. 3) that optically detects the black marks BM formed on the label sheet 14 being conveyed is provided at a predetermined position on the conveyance path of the label sheet 14. The inkjet printer 5 detects that the black mark BM reaches the position corresponding to the sensor, based on a detection value of the black mark sensor 42. The inkjet printer 5 adjusts a position of the label sheet 14 or processing relating to the conveyance, based on the detection result.

The inkjet printer 5 shown in FIG. 1 is a line-type inkjet printer having an upstream head unit 17 and a downstream head unit 18.

In the upstream head unit 17, three printing heads of an upstream-side top printing head 17T, an upstream-side left printing head 17L and an upstream-side right printing head 17R are arranged in a zigzag shape. Likewise, in the downstream head unit 18, three printing heads of a downstream-side top printing head 18T, a downstream-side left printing head 18L and a downstream-side right printing head 18R are arranged in a zigzag shape.

The upstream-side top printing head 17T is provided with a black nozzle line 20 and a cyan nozzle line 21 arranged at a downstream side of the black nozzle line 20.

The black nozzle line 20 is a nozzle line of which nozzle holes (not shown) discharging ink as fine ink particles are formed with extending in a nozzle line direction YJ2 perpendicular to the conveyance forward direction YJ1. The black nozzle line 20 is supplied with the ink from a black (B) ink cartridge (not shown). The upstream-side top printing head 17T extrudes the ink, which is supplied from the black (B) ink cartridge, towards the label sheet 14 to thus discharge the fine ink particles through the predetermined nozzle holes by an actuator that is configured using a piezo device, for example.

The cyan nozzle line 21 is a nozzle line of which nozzle holes extend in the nozzle line direction, like the black nozzle line 20, and is supplied with the ink from a cyan (C) ink cartridge (not shown).

The upstream-side right printing head 17R and the upstream-side left printing head 17L have the same configuration as the upstream-side top printing head 17T, and have the black nozzle line 20 and the cyan nozzle line 21 arranged at the downstream side of the black nozzle line 20, respectively.

The downstream-side top printing head 18T is provided with a magenta nozzle line 22 and a yellow nozzle line 23 that is arranged at a downstream side of the magenta nozzle line 22.

The magenta nozzle line 22 is a nozzle line of which nozzle holes extend in the nozzle line direction, like the black nozzle line 20, and is supplied with the ink from a magenta (M) ink cartridge (not shown).

The yellow nozzle line 23 is a nozzle line of which nozzle holes extend in the nozzle line direction, like the black nozzle line 20, and is supplied with the ink from a yellow (Y) ink cartridge (not shown).

The downstream-side right printing head 18R and the downstream-side left printing head 18L have the same configuration as the downstream-side top printing head 18T, and have the magenta nozzle line 22 and the yellow nozzle line 23 arranged at the downstream side of the magenta nozzle line 22, respectively.

Meanwhile, in FIG. 1, the respective printing heads and the nozzle lines of the printing heads are explicitly shown for convenience of explanations. However, actually, the ink is discharged vertically downwards from the nozzle holes configuring the nozzle lines, and the respective members are arranged for implementation of the corresponding configuration.

The inkjet printer 5 discharges the inks onto the label sheet 14 to thus form dots and prints an image by a combination of the dots. In the below, a basic operation that is performed when one dot is formed on the label sheet 14 is described with reference to FIG. 1.

It is assumed that the label sheet 14 is located at the position of FIG. 1 and a dot of a predetermined color is formed at a position P1 on the label sheet 14. The predetermined color is a color that is expressed as the inks of black (K), cyan (C), magenta (M) and yellow (Y) are discharged in a predetermined amount, respectively. In FIG. 1, a position P2 is a position of the black nozzle line 20 formed on the upstream-side top printing head 17T, through which the position P1 of the recording medium, which is being conveyed, passes. A position P3, a position P4 and a position P5 are also the same.

While forming a dot on the label sheet 14, the inkjet printer 5 conveys the label sheet 14 towards the conveyance forward direction YJ1 at substantially constant speed. Then, at timing at which the position P1 on the label sheet 14 reaches a position corresponding to the position P2 as the label sheet 14 is conveyed from the state of FIG. 1 in the conveyance forward direction YJ1, a predetermined amount of the black (B) ink is discharged from the nozzle corresponding to the position P2. Likewise, at timing at which the position P1 on the label sheet 14 reaches the position P3, a predetermined amount of the cyan (C) ink is discharged from the nozzle corresponding to the position P3, at timing at which the position P1 on the label sheet 14 reaches the position P4, a predetermined amount of the magenta (M) ink is discharged from the nozzle corresponding to the position P4 and at timing at which the position P1 on the label sheet 14 reaches the position P5, of a predetermined amount of the yellow (Y) ink is discharged from the nozzle corresponding to the position P5.

In this way, the inks of black (K), cyan (C), magenta (M) and yellow (Y) are discharged to the position P1 on the label sheet 14 in a predetermined amount, respectively, and a dot of a predetermined color is formed at the position P1.

That is, in the inkjet printer 5 of this illustrative embodiment, during the processing relating to the image printing, a position of the line inkjet head 12 is fixed, and the inks are appropriately discharged from the line inkjet head 12 while the label sheet 14 is moved at constant speed relative to the fixed line inkjet head 12, so that the dots are formed and an image is thus printed.

Figure 3:
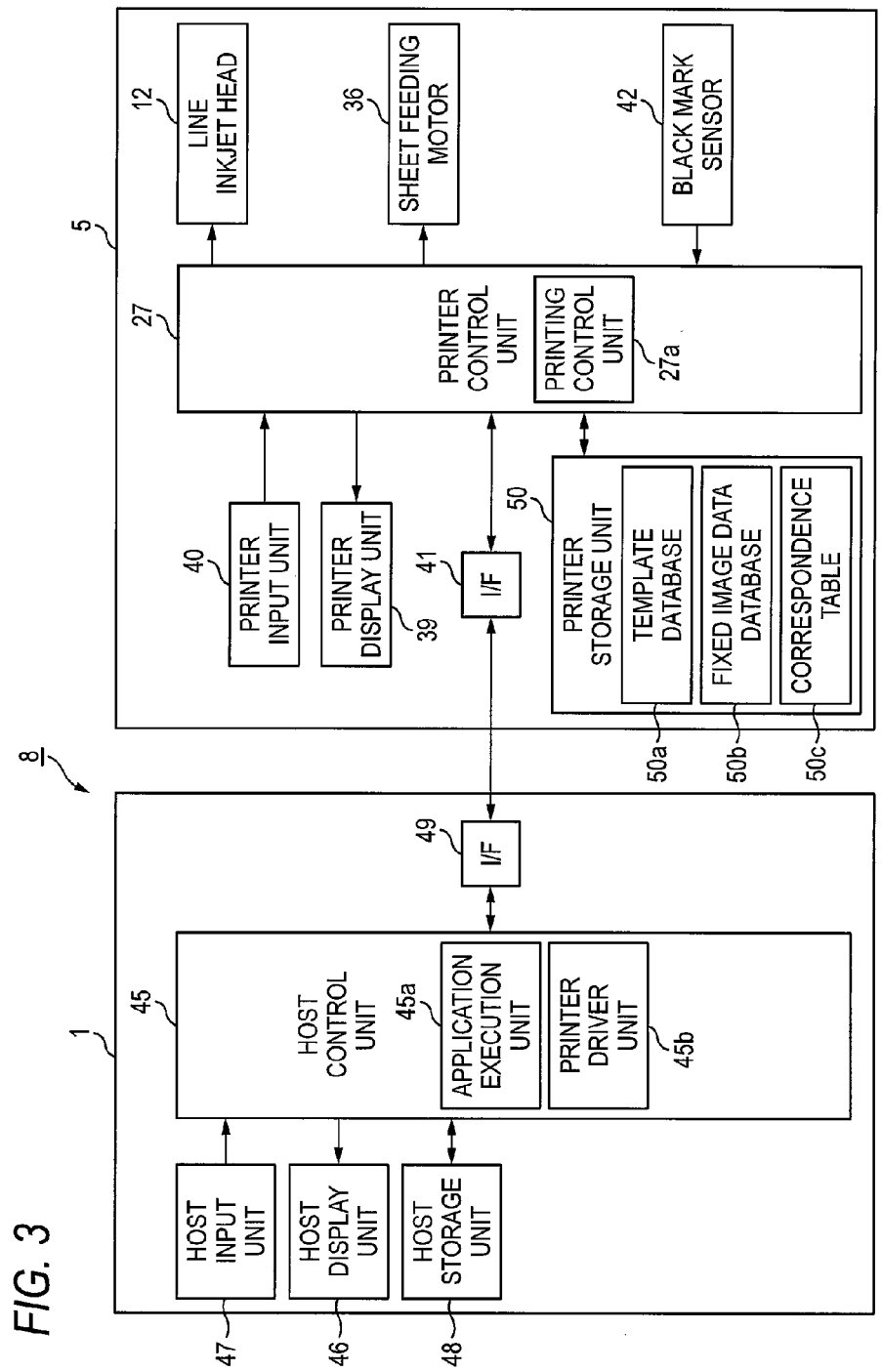
FIG. 3 is a block diagram showing functional configurations of a host computer and the line inkjet printer.

FIG. 3 is a block diagram pictorially showing a functional configuration of a printing system 8 (the control system) of this illustrative embodiment.

As shown in FIG. 3, the printing system 8 includes the inkjet printer 5 and a host computer 1 (the control apparatus) that can be connected to (perform communication with) the inkjet printer 5 and controls the inkjet printer 5.

A printer control unit 27 (the control unit) of the inkjet printer 5 controls respective units of the inkjet printer 5. The printer control unit 27 has a CPU serving as a calculation execution unit, a ROM that non-volatilely stores therein firmware, which can be executed by the CPU, data relating to the firmware and the like, a RAM that temporarily stores therein the firmware, which is executed by the CPU, the data relating to the firmware, and the like, a peripheral circuit and the like. The printer control unit 27 has a printing control unit 27*a*, as a functional block, which will be described later.

The printer control unit 27 drives the actuators, which are provided for the respective inkjet heads of the line inkjet head 12, and discharges the inks from the nozzle holes in necessary amounts, thereby printing an image on the label sheet 14. Also, the printer control unit 27 drives a sheet feeding motor 36 for driving the conveyance roller 10, thereby moving the label sheet 14 by a predetermined amount. As the sheet feeding motor 36 is driven, the conveyance roller 10 is rotated, so that the recording medium is conveyed in the conveyance forward direction YJ1 by a predetermined amount. The sheet feeding motor 36 consists of a stepping motor and the printer control unit 27 can precisely manage a conveying amount by a number of steps. The black mark sensor 42 optically reads out the black mark BM formed on the label sheet 14 that is being conveyed on the conveyance path, and outputs a reading result to the printer control unit 27. A printer display unit 39 has a plurality of LEDs and turns on/off the LEDs in a predetermined aspect under control of the printer control unit 27, thereby reporting a status of the inkjet printer 5 or whether an error occurs. A printer input unit 40 is connected to a variety of switches provided for the inkjet printer 5, detects operations for the various switches and outputs the same to the printer control unit 27. A printer storage unit 50 (the storage unit) has a non-volatile memory such as an EEPROM, a hard disk and the like, and non-volatilely stores various data so that the data can be overwritten. The various data that is stored in the printer storage unit 50 will be described later. A communication interface 41 (I/F) performs communication with the host computer 1, based on a predetermined protocol, under control of the printer control unit 27.

As shown in FIG. 3, the host computer 1 has a host control unit 45 that controls respective units of the host computer 1. The host control unit 45 has an application execution unit

45a and a printer driver execution unit 45b, as functional blocks, which will be described later.

Also, the host computer 1 has a host display unit 46 that displays a variety of information, a host input unit 47 that detects an operation on an input device connected to the host computer, a host storage unit 48 that stores various data and a communication interface 49 (I/F) that relays communication with the inkjet printer 5.

In the printing system 8 of this illustrative embodiment, it is possible to continuously form images on the label parts S of the label sheet 14. In the below, a specific example relating to an image printing on the label parts S of the label sheet 14 is described. Here, the description of "continuously printing images" means that a printing for a next label part S starts before a printing for one label part S is completed.

Figure 4A:
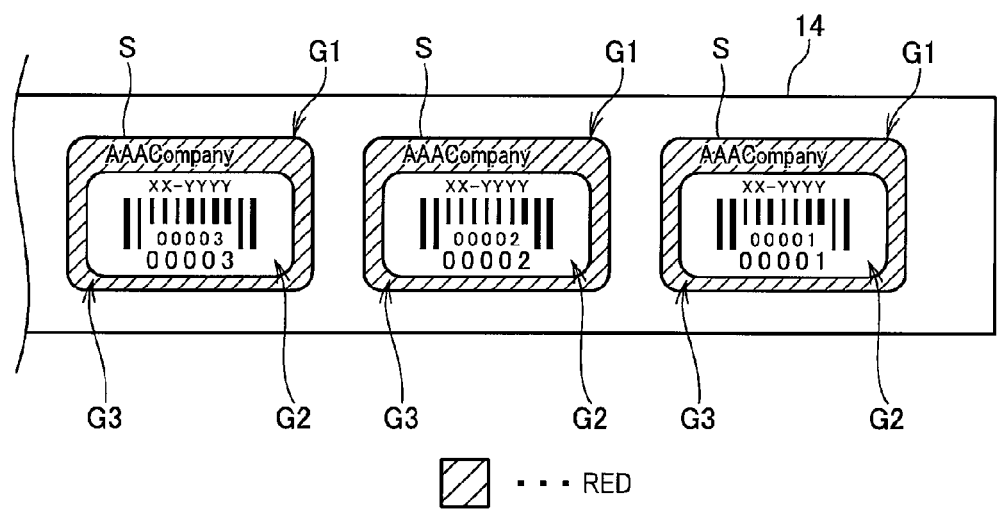
FIG. 4A shows a pattern in which label images are printed on label parts of the label sheet.

FIG. 4A shows an example of images (label images) that are printed on the label parts S of the label sheet 14 by the printing system 8 according to this illustrative embodiment. In the below example, it is assumed that the printing system 8 is used to issue a label at a site for manufacturing a television as a product. It is assumed that the label parts S are peeled off from the release sheets and are adhered on the television (or a package of the television) as a product.

As shown in FIG. 4A, a label image G1 is printed on each label part S. Each label image G1 includes a variable image G2 of which an aspect can be varied for each label image G1, and a fixed image G3 of which an aspect is the same for each label image G1.

In the example of FIG. 4A, the fixed image G3 is an image having a red frame shape that is formed along outer edges of the label part S. In the fixed image G3, a maker name 'AAACompany' of the television is denoted at a part corresponding to an upper side of the outer edges. As shown in FIG. 4A, the aspect of the fixed image G3 to be printed on each label part S is the same.

The variable image G2 is an image that is printed in a domain surrounded by the frame-shaped fixed image G3. The variable image G2 includes a character string ('XX-YYY' in the example of FIG. 4A) indicating a model name of the television, a barcode indicating a code that is uniquely assigned for each television, and a character string (five-digit numbers in the example of FIG. 4A) indicating an identification number that is uniquely assigned for each television. The barcode and identification number to be printed for each variable image G2 are different. That is, the aspect of the variable image G2 is different for each label image G1.

Figure 4B:
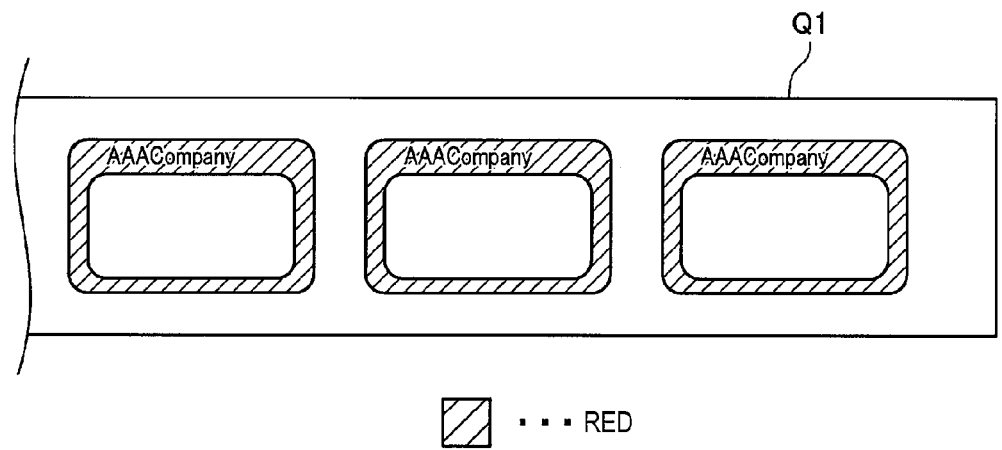
FIG. 4B shows a label sheet of the related art.

Here, in the related art, when printing the label image G1 including the variable image G2 and the fixed image G3 on the label parts S, a label sheet Q1 shown in FIG. 4b is used.

As shown in FIG. 4B, the fixed image G3 is beforehand printed on each label part S of the label sheet Q1. The printer of the related art prints the variable images G2 on the label parts S, so that the label image G1 including the fixed image G3 and the variable image G2 is printed on each label part S.

In this case, following problems occur. That is, the fixed image G3 is beforehand printed on the label sheet Q1. Therefore, when a design of the fixed image G3 is changed, the label sheet Q1 on which the fixed image G3 before the design is changed is printed may be useless. Also, a replacement frequency of the label sheet may be increased depending on preparation purposes thereof.

The printing system 8 of this illustrative embodiment solves the above problems by executing following processing with configurations that will be described later. In particular, the printing system 8 of this illustrative embodiment can print a variable image in an appropriate aspect based on an aspect of a fixed image by using a template (which will be described later) and solve the above problems without modifying an application of the related art. These are specifically described as follows.

First, the template is described.

The inkjet printer 5 of this illustrative embodiment can print an image on the label part S, based on a template.

Figures 5A, 5B:
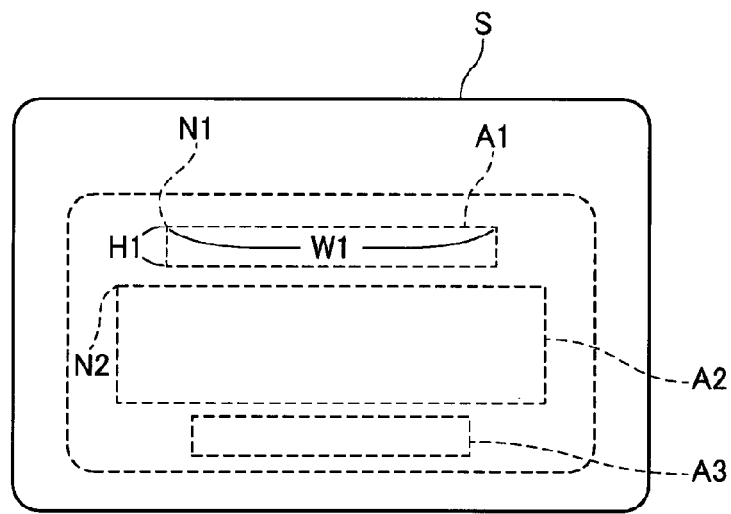
FIG. 5A shows areas that are defined by a template.
FIG. 5B shows an example of a data structure of a template database.

The template is information that includes at least information relating to a position at which an image is printed. Particularly, in this illustrative embodiment, the template includes information indicating an aspect of an area that is formed in a printable domain of the label part S. That is, the area is defined in the template. The printable domain means a maximum domain in which an image can be printed (a dot can be formed) on one label part S. Also, the area means each divided domain when the printable domain is divided into one or more domains. In this illustrative embodiment, a plurality of templates in which aspects of areas in the printable domain are different is beforehand prepared, and the inkjet printer 5 can record an image on a label, based on one arbitrary template. The template may include an attribute relating to the image printing, in addition to the information relating to the position at which an image is printed. The attribute is information relating to formats such as a size, a color, a font and the like of an image. Also, since the attribute is associated with the position, the attribute may be included in the information relating to the position. FIG. 5A pictorially shows the label part S on which areas are indicated by one template T1 of the templates beforehand prepared. In FIG. 5A, each area that is defined by the template T1 is explicitly shown on the label part S on which the fixed image G3 is printed, for convenience of explanations.

As described later, the inkjet printer 5 is configured to print the 'variable images G2', based on the templates. The template T1 that is described using FIG. 5A is a template corresponding to the variable image G2 exemplified in FIG. 4A. That is, the variable image G2 exemplified in FIG. 4A is printed on the label part S, based on the template T1.

As shown in FIG. 5A, in the template T1, three rectangular areas of an area A1 to an area A3 are formed in the printable domain of the label part S from the upper to the lower in corresponding order. Each area of the area A1 to the area A3 is configured so as to have no part that overlaps with the fixed image G3. Therefore, when printing the variable image G2 on the basis of the template T1, the variable image G2 is printed in an appropriate aspect without overlapping with the fixed image G3. That is, the template T1 has a variety of information so that when printing the variable image G2 on the basis of the template T1, the variable image G2 is printed in an appropriate aspect based on the aspect of the fixed image G3.

The information about the templates is stored in a template database 50a for each template.

FIG. 5B pictorially shows a data structure of the template database 50a. In FIG. 5B, records of the template T1 of FIG. 5A are exemplified. Meanwhile, in the example of FIG. 5B, the template database 50a is a relation database. However, the aspect of the template database 50a may be arbitrary.

A template name D1 means a name (identification information) that is uniquely assigned to each template.

An area name D2 means a name (identification information) that is assigned to each area formed in the template. As shown in FIG. 5A, the template T1 is formed with the three areas of the area A1 to the area A3. In this case, as shown in FIG. 5B, the template database 50a is provided with three records corresponding to the three areas A1 to A3, and the appropriate area name D2 is stored in a field corresponding to each record.

An area reference coordinates D3 is coordinates of a reference point of an area in a coordinates system in which a specific position in the printable domain of the label part S is the origin. By the coordinates of the coordinates system, an arbitrary position in the printable domain of the label part S can be designated. Here, in this example, a shape of each area in the printable domain is a rectangle of which two sides, which are opposed in parallel in a width direction of the label sheet 14, are formed and other two sides, which are opposed in parallel in a longitudinal direction, are formed. The reference point of the area indicates an apex, which is positioned in a specific direction, of four apexes formed at edges of the area. In this example, a left-upper apex of the four apexes is a reference point, as shown with an apex N1 of the area A1 or apex N2 of the area A2.

A size D4 means information indicating a width length W and a longitudinal length H of each area. For example, in the area A1 of FIG. 5A, the information indicating a length W1 and a length H1 corresponds to the size D4. As described above, each area is rectangular. Therefore, a position and a shape of each area in a recording domain are uniquely determined by the area reference coordinates D3 and the size D4.

An image type D5 means information indicating a type of an image that is printed in each area. In this illustrative embodiment, the type of the image includes 'text' and 'barcode'. The text is a type relating to an image consisting of a character, more specifically, an image that is printed on the basis of font data embedded in the inkjet printer 5. In the meantime, the barcode is a type relating to a barcode image.

An operation that is performed when printing an image (the variable image G2) based on the template is specifically described later.

Subsequently, a fixed image data database 50b stored in the printer storage unit 50 (FIG. 3) and registration of image data of the fixed image G3 (hereinafter, referred to as 'fixed image data') are described.

In this illustrative embodiment, a user generates in advance fixed image data and associates and stores the generated fixed image data with unique identification information (hereinafter, referred to as 'image data identification information') in the fixed image data database 50b.

For example, the user prepares the fixed image data by using an application installed in the host computer 1 or a software tool of the other external device. Then, the user generates one record in the fixed image data database 50b by using a user interface provided by the application or tool, and associates and stores the generated fixed image data with the image data identification information in the record.

In the below descriptions, it is assumed that at least fixed image data KG (not shown), which is the fixed image data of the fixed image G3 exemplified in FIG. 4A, is associated with the image data identification information and stored in the fixed image data database 50b.

Subsequently, a correspondence table 50c is described.

The correspondence table 50c is a table in which the template name of the template (the identification information of the template) and the image data identification information of the fixed image data are associated and stored.

As for the association of the template name and the image data identification information in the correspondence table 50c, the user is provided with a predetermined user interface. The predetermined user interface may be provided by a function of an application installed in the host computer 1 or by a function of a software tool installed in the other external device.

The user can associate and store, in the correspondence table 50c, the template name of any one template of the templates stored in the template database 50a and the image data identification information of any one fixed image data of the fixed image data stored in the fixed image data database 50b. In the meantime, it is not possible to associate any one specific template (the template name thereof) with the other multiple fixed image data (the image data identification information thereof), i.e., any one specific template name with the image data identification information of the other multiple fixed image data. Such association is appropriately prohibited by the user interface.

In the correspondence table 50c, the fixed image G3 and the template, which are associated with each other, have a following relation. That is, the user appropriately associates the template name of the template with the image data identification information of the fixed image data so that a following relation is satisfied.

That is, the relation is such that when printing the variable image G2 with being superimposed over the fixed image G3 based on the template, the variable image G2 is printed in an appropriate aspect based on the aspect of the fixed image G3.

In this example, the template name of the template T1 and the image data identification information of the fixed image data KG (not shown) are associated in the correspondence table 50c.

Meanwhile, in this example, the correspondence table 50c is the independent data. However, the correspondence table 50c may be a table that is defined on a program for implementing functions of the printing control unit 27a.

FIG. 6 is a flowchart showing operations of the host computer 1 and the inkjet printer 5, which are performed when printing the label image G1 of the one label part S. FIG. 6(A) shows the operations of the host computer 1 and FIG. 6(B) shows the operations of the inkjet printer 5.

In the meantime, the host computer 1 and the inkjet printer 5 execute the operations shown in the flowchart of FIG. 6 at appropriate timing for each label part S while conveying the label sheet 14 at constant speed, thereby continuously printing the label images G1 on the label parts S of the label sheet 14.

When printing the label image G1 on the label part S, the application execution unit 45a of the host computer 1 generates the information about the variable image G2 and outputs the same to the printer driver execution unit 45b (step SA1). The application execution unit 45a is a functional block of which a function is implemented as an application (program) installed in advance is executed. Also, the printer driver execution unit 45b is a functional block of which a function is implemented as a printer driver (program) installed in advance is executed. The information about the variable image G2 that is generated by the application execution unit 45a includes at least following information. That is, the information includes the template name of the template that is used to print the variable image G2. Furthermore, the information includes information in which the area name and information about an image to be printed in an area are associated for each area defined in the template. The information about an image to be printed in an area is a character string when the image type D5 of the area is 'text' and is a code of the barcode when the image type D5 is 'barcode'.

Subsequently, the printer driver execution unit 45b generates a control command for instructing the printing of the variable image G2 based on the template, on the basis of the input information (step SA2) and transmits the same to the inkjet printer 5 (step SA3). The control command includes at least the template name of the template that is used to print the variable image G2 and the information in which the area name and the information about an image to be printed in an area are associated for each area defined in the template.

When the control command is received (step SB1), the printing control unit 27a of the printer control unit 27 of the inkjet printer 5 extracts and acquires the template name from the control command (step SB2).

Then, the printing control unit 27a refers to the correspondence table 50c (step SB3) and acquires the image data identification information associated with the template name, based on the template name acquired in step SB2 (step SB4).

Then, the printing control unit 27a refers to the fixed image data database 50b (step SB5) and acquires the fixed image data associated with the image data identification information, based on the image data identification information acquired in step SB4 (step SB6).

Then, the printing control unit 27a develops the fixed image data acquired in step SB6 into a printing buffer (not shown) (step SB7).

Then, the printing control unit 27a refers to the template database 50a (step SB8) and specifies a record (acquires a template) corresponding to the template name, based on the template name acquired in step SB2 (step SB9)

Then, the printing control unit 27a generates the image data of the variable image G2, based on the template (step SB10). Specifically, the printing control unit 27a recognizes the position and shape of each area, based on the area reference coordinates D3 and size D4 in the record specified in step SB9, and also recognizes a type of the image to be printed in each area, based on the image type D5. Then, the printing control unit 27a executes appropriate image processing depending on the type of the image and then generates image data (the image data of the variable image G2) relating to an image in which appropriate images are arranged in an appropriate aspect in each area defined in the template. The appropriate image processing depending on the type of the image is processing of converting characters configuring the character string into font data when the type of the image is a text, for example. Also, for example, when the type of the image is a barcode, the appropriate image processing is processing of converting the code into a barcode image by a function of a predetermined program.

Then, the printing control unit 27a develops the generated image data of the variable image G2 into the printing buffer (step SB11). At this time, the printing control unit 27a develops the image data of the variable image G2 into the printing buffer while superimposing the same over the image data of the fixed image G3 developed already. Thereby, the image data of the label image G1 including the fixed image G3 and the variable image G2 is developed into the printing buffer.

Then, the printing control unit 27a prints the label image G1 on the label part S by controlling a variety of mechanisms relating to the printing, based on the image data developed into the printing buffer (the image data of the label image G1) (step SB12). Thereby, the label image G1 in which the fixed image G3 and the variable image G2 are superimposed is printed on the label part S.

Like this, according to the printing system 8 of this illustrative embodiment, when printing the label image G1, the label image G1 having the fixed image G3 and variable image G2 superimposed is printed on each label part S, instead of using the label sheet 14 on which the fixed image G3 is beforehand printed on each label part S. Therefore, even when a design of the fixed image G3 is changed, it is possible to prevent the label sheet 14 from being useless while not destroying the label sheet 14. Also, it is possible to suppress the replacement frequency of the label sheet 14.

Also, in this illustrative embodiment, when printing the label image G1 on the label part S, the control command for instructing the printing of the variable image G2 is transmitted from the host computer 1 to the inkjet printer 5.

Here, as described above, according to the printing system of the related art, the label sheet 14 on which the fixed image G3 is printed in advance is set on the line inkjet printer. Then, when printing the label image G1 on the label part S, the host computer of the related art also transmits the control command for instructing the printing of the variable image G2, like the host computer 1 of this illustrative embodiment. The line inkjet printer of the related art prints the variable image G2 on the label part S according to the template, based on the control command. Thereby, the label image G1 including the fixed image G3 and the variable image G2 is printed on the label part S.

That is, when printing the label image G1, the content of the control command that is transmitted by the host computer of the related art is the same as that of the control command that is transmitted by the host computer 1 of this illustrative embodiment. For this reason, when applying the exemplary embodiment, it is not necessary to modify the software (for example, the application or printer driver) of the host computer 1. For example, the exemplary embodiment can be applied by newly connecting the printing apparatus having the above various functions to the host computer of the related art and implementing the above various functions in the existing printing apparatus. Therefore, the user can obtain an effect of removing a waste of the label sheet 14 by a simple means without modifying the software of the host computer.

As described above, the inkjet printer 5 (the printing apparatus) according to an illustrative embodiment of the exemplary embodiment has the printer storage unit 50 (the storage unit) in which the image data of the fixed image G3 and the template having at least the information about rules of the positions of printing the images are associated and stored. Furthermore, the inkjet printer 5 has the printing control unit 27a that, when the control command, which includes the information for designating the template and instructs the printing of the variable image G2 on the basis of the template, is input from the host computer 1, superimposes and prints the fixed image G3 and variable image G2, based on the control command and the image data of the fixed image G3 associated with the template.

According to the above configuration, the inkjet printer 5 stores the image data of the fixed image G3 in advance, and superimposes and prints the fixed image G3 and variable image G2, based on the image data of the fixed image G3, when the control command is input. For this reason, it is not necessary to print the fixed image G3 on the recording medium such as the label sheet 14 in advance, and even when the design of the fixed image G3 is changed, it is possible to suppress the waste of the recording medium because it is not necessary to destroy the recording medium. Also, it is possible to suppress the replacement frequency of the recording medium.

Furthermore, according to the above configuration, the inkjet printer 5 associates and stores the image data of the fixed image G3 and the template. The template includes the information in which the positions of printing the respective images configuring the variable image G2 are defined, so as to print the variable image G2 at the appropriate position based on the aspect of the corresponding fixed image G3. When the control command, which includes the information for designating the template and instructs the printing of the variable image G2 on the basis of the template, is input from the host computer 1, the inkjet printer 5 superimposes and prints the fixed image G3 and variable image G2, based on the control command and the image data of the fixed image G3 associated with the template. For this reason, the inkjet printer 5 can print the variable image G2 in an appropriate aspect with respect to the relation with the fixed image G3, based on the template.

Also, in an illustrative embodiment of the invention, the control command that includes the information for designating the template and instructs the printing of the variable image G2 on the basis of the template is input for each label part S from the host computer 1 to the inkjet printer 5. Then, the printing control unit 27a of the inkjet printer 5 superimposes and prints the fixed image G3 and variable image G2 for each label part S, based on the input control command.

According to the above configuration, it is possible to continuously print the label image G1 including the fixed image G3 and variable image G2 on each label part S without printing the fixed image G3 in advance on each label part S.

Also, in an illustrative embodiment of the invention, the template has information defined therein about the position of printing the image so that the variable image G2 and the fixed image G3 do not overlap with each other when printing the variable image G2 with being superimposed over the fixed image G3 on the basis of the template.

According to the above configuration, when superimposing and printing the variable image G2 and fixed image G3, it is possible to prevent the variable image G2 and the fixed image G3 from being printed with being overlapped.

In the meantime, the illustrative embodiments simply show an aspect of the invention and can be arbitrarily modified and applied within the scope of the invention.

For example, the configuration of the label image G1 shown in FIG. 4 is just exemplary. That is, the label image G1 is a concept that comprehensively includes the image having the fixed image G3 and the variable image G2.

Also, for example, the respective functional blocks shown in FIG. 3 can be arbitrarily implemented by cooperation of the hardware and the software and do not suggest a specific hardware configuration. Also, the respective functions of the host computer 1 and the inkjet printer 5 may be provided for a separate apparatus that is externally connected to the corresponding apparatuses. Also, the host computer 1 and the inkjet printer 5 may execute the various operations by executing programs stored in a storage medium that is externally connected.

What is claimed is:

1. A label printer configured to be able to couple to a computer, the label printer comprising:
   a storage configured to associate and store therein:
      fixed image data and designation information;
      a template having position information about a position of printing a variable image data on a label and a template name; and
      the designation information and the template name;
   a print buffer configured to store image data;
   a printing mechanism configured to print the image data on the label; and
   a controller configured to, when receiving a command which includes the template name and the variable image data from the computer, read the designation information associated with the received template name from the storage, read the fixed image data associated with the designation information from the storage, write the readout fixed image into the print buffer, readout the template associated with the template name from the storage, write the variable image data into the print buffer based on the position information in the template;
   wherein the command doesn't include fixed image information, and the printing mechanism prints the fixed image data and the variable image data wrote in the print buffer on the label based on the command.

2. The label printer according to claim 1, wherein the label is disposed on a label sheet at an interval,
   wherein one designation information is associated with one template name in the storage, and
   wherein when the controller receives a plurality of the command each of which includes the same template name, the fixed images which are the same images are continuously printed on the label.

3. The label printer according to claim 1, wherein when the controller writes the variable image and the fixed image data into the print buffer, the controller avoids that the variable image data and the fixed image data overlap with each other.

4. The label printer according to claim 1, wherein the fixed image data is a substitute for an image previously printed on the label.

5. The label printer according to claim 1, wherein the template includes information regarding size and kind of the variable image.

6. A control method of a label printer configured to be able to couple to a computer, the control method comprising:
   associating a fixed image data and a designation information;
   associating a template having position information about a position of printing a variable image on a label and a template name;
   associating the designation information and the template name;
   when receiving a command which includes the template name and the variable image data from the computer, acquiring the designation information associated with the received template name, acquiring the fixed image data associated with the designation information, writing the acquired fixed image into a print buffer, acquiring the template associated with the template name, writing the received variable image data into the print buffer based on the position information in the template and printing the fixed image data and the variable image data wrote in the print buffer on the label based on the command;
   wherein the command doesn't include fixed image information.

7. The control method according to claim 6, wherein the label is disposed on a label sheet at an interval,
   wherein one designation information is associated with one template name, and
   wherein when receiving a plurality of the command each of which includes the same template name, the fixed images which are the same images are continuously printed on the label.

8. The control method according to claim 6, wherein when writing the variable image and the fixed image data into the print buffer, avoiding that the variable image data and the fixed image data overlap with each other.

9. The control method according to claim 6, wherein the fixed image data is a substitute for an image previously printed on the label.

10. The control method according to claim 6, wherein the template includes information regarding size and kind of the variable image.

11. A storage medium storing a program controlling a label printer configured to be able to couple to a computer having a controller, the storage medium storing:

the program causing the controller to execute steps, said steps comprising:

associating a fixed image data and a designation information;

associating a template having position information about a position of printing a variable image on a label and a template name;

associating the designation information and the template name;

when receiving a command which includes the template name and the variable image data from the computer, acquiring the designation information associated with the received template name, acquiring the fixed image data associated with the designation information, writing the acquired fixed image into a print buffer, acquiring the template associated with the template name, writing the received variable image data into the print buffer based on the position information in the template and printing the fixed image data and the variable image data wrote in the print buffer on the label based on the command;

wherein the command doesn't include fixed image information.

12. The storage medium according to claim 11, wherein the label is disposed on a label sheet at an interval, wherein one designation information is associated with one template name, and wherein when receiving a plurality of the command each of which includes the same template name, the fixed images which are the same images are continuously printed on the label.

13. The storage medium according to claim 11, wherein when writing the variable image and the fixed image data into the print buffer, avoiding that the variable image data and the fixed image data overlap with each other.

14. The storage medium according to claim 11, wherein the fixed image data is a substitute for an image previously printed on the label.

15. The storage medium according to claim 11, wherein the template includes information regarding size and kind of the variable image.

* * * * *